Feb. 11, 1930.   F. J. CLARK   1,746,929
TEMPERATURE INDICATING INSTRUMENT FOR PRESSING IRONS
Filed Feb. 13, 1926

INVENTOR.
Frederick J. Clark,
By Parker & Prochnow
ATTORNEYS.

Patented Feb. 11, 1930

1,746,929

UNITED STATES PATENT OFFICE

FREDERICK J. CLARK, OF BUFFALO, NEW YORK, ASSIGNOR TO STEAM PRESSING IRON COMPANY, OF CHICAGO, ILLINOIS, A CORPORATION OF DELAWARE

TEMPERATURE-INDICATING INSTRUMENT FOR PRESSING IRONS

Application filed February 13, 1926. Serial No. 88,163.

This invention relates to improvements in temperature indicating instruments or devices provided with a thermally controlled element adapted to actuate a movable indicating member, such as are used on pressing irons to enable the temperature of the iron to be indicated and controlled for different classes of work.

It is necessary, in using the irons for different kinds of work to maintain the temperature of the heating surface of the iron within a prescribed range or limit. That is, the temperature which is suitable for the proper results on one class or sort of goods is unsuitable for use with another class of goods. If such precautions are not taken, goods may be spoiled if the temperature of the iron is too high, or the work will proceed too slowly if the temperature is low. By providing the iron with an indicating instrument, the operator can see when the iron is at approximately the correct heat for the work in hand.

The objects of the invention are to provide an improved simplified, reliable and practical device of this character adapted to be readily applied as a unit to irons of various forms and types; also to construct a temperature indicating instrument of this kind having a casing and provided with means for adjustably mounting the thermal element in said casing; also to provide a temperature indicating instrument so constructed that all parts thereof can be produced in quantity in a uniform and economical manner, and in which, nevertheless, the thermal element is provided with an indicating member which can be adjusted relatively to the cooperating scale or member whereby the device is adapted to be used on different implements, and to be readily set to properly indicate the temperature of the pressing faces of the implements, notwithstanding variations in their initial temperature readings, and also to improve temperature indicating instruments of the character described in the other respects hereinafter set forth.

In the accompanying drawings.

Figure 1:
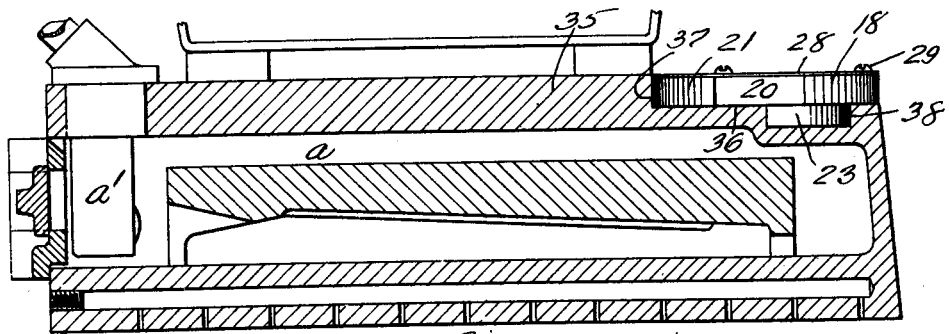
Fig. 1 is a longitudinal, vertical section of a gas heated iron provided with a temperature indicating device embodying the invention, said device being shown in side elevation.
Figures 2, 3:
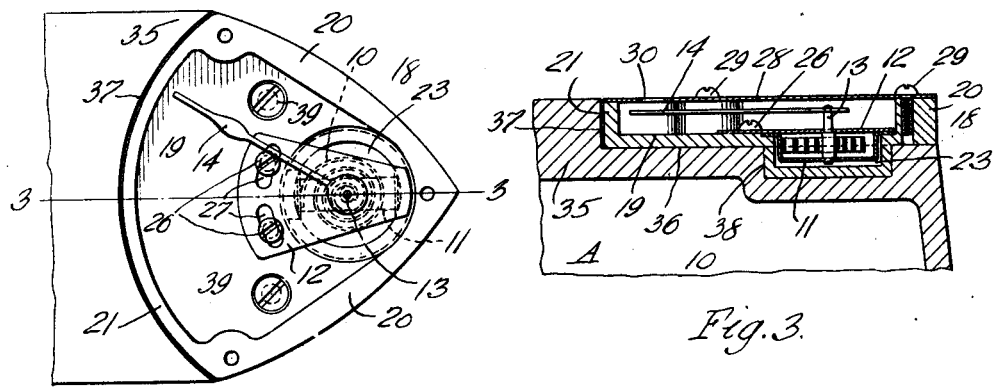
Fig. 2 is a plan view of the temperature indicating device on an enlarged scale, with its cover removed, and showing the adjacent portion of the iron.
Fig. 3 is a longitudinal, vertical section thereof, on line 3—3, Fig. 2, but with the cover attached.

The thermal element used in the indicating instrument of the present invention may be of any suitable type, that shown comprising a coiled monometallic thermal strip 10, having one of its ends secured to a side arm of a yoke 11 fixed to the underside of a supporting plate 12. The other or inner end of the coil 10 is secured to a post 13 journaled in bearing holes in the yoke and in the supporting plate 12 at opposite sides of the coil. The post 13 is adapted to turn in its bearings with the contraction and expansion of the thermal coil due to changes in temperature, and a horizontal indicating member or pointer 14, rigidly secured to the upper end of the post is adapted to swing with the post to show the degree of movement thereof.

In accordance with the invention, the thermal element and its support is mounted in a shallow casing or housing 18 having a bottom 19, and side and end walls 20, 21, respectively, said side walls preferably conforming to the shape of the pointed front end of the iron A. The casing 18 is provided with a depressed, cylindrical pocket or chamber 23. The thermal strip 10 and yoke 11 extend into this pocket 23, while the supporting plate 12 extends across the pocket in the casing and is stationarily secured on the bottom thereof, as by screws or other removable fastening devices 26, extending through elongated or enlarged apertures 27 in the plate 12 and into threaded holes in said bottom 19.

Figure 4:
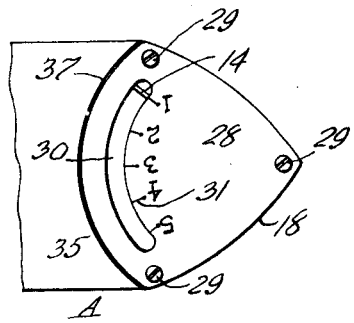
Fig. 4 is a plan view thereof, on the same scale as Fig. 1, showing the cover in place.
Figure 5:
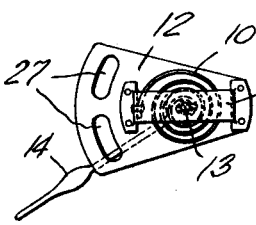
Fig. 5 is a bottom face view of the thermal element of the device and its mounting, detached from the instrument.

The open top of the casing 18 is closed by a cover plate 28 secured by screws 29, and the cover plate is provided with an arcuate slot 30 formed concentrically with the pivot post 13 and beneath which the free end of the pointer 14 moves. The cover plate is provided, adjacent the slot 30, with graduations 31, Fig. 4, whereby the extent of movement of the pointer may be noted.

In the arrangement shown in Figs. 1–4, the top wall 35 of the iron A is cut away at the front end of the iron so as to provide a shallow seat of substantially the depth of the casing 18 having a flat, horizontal face 36, and a transverse, vertical shoulder 37. The face 36 is recessed at 38 and the depressed lower portion of the casing 18 fits into this recess with its bottom 19 engaging the face 36. Thus the cover of the indicating instrument lies flush with the top face of the iron and forms substantially a continuation thereof. The shoulder 37 preferably conforms to the end wall 21 of the casing, which wall is preferably concentric with the pivot 13. The graduations or scale, however, may be formed on part of the iron adjacent the shoulder 37 or indicator 14, if desired.

The casing is secured to the iron in any suitable way, as by screws 39 passing downwardly through holes in the bottom 19 of the casing into threaded holes in the top face 36 of the iron.

Figure 6:
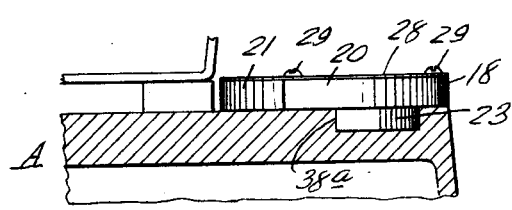
Fig. 6 is a side elevation of the indicating instrument attached to an iron in a slightly different manner from that shown in Figs. 1-4.

In the modified form shown in Fig. 6, the casing 18 rests directly on the top face of the iron, which is provided only with a recess 38ᵃ for the reception of the pocket 23. The casing, as before, is secured by screws or fastenings (not shown) similar to the screws 39.

In the iron shown, and in other irons of the type before mentioned, the top and bottom walls of the iron are usually separated by a heating chamber or space a, so that a difference exists between the temperature of the bottom wall or portion of the iron which contacts with the goods when in use, and the top wall or part of the iron, and, furthermore, this difference varies in the individual irons of the same make or type.

It is desirable, however, to mount the temperature indicating instrument or device on the top of the iron, as described, whereby the readings can be readily seen, and also that the fitting of the device to the iron may be accomplished with the minimum of labor. Also, in order to enable the cover plates or other parts of the instruments bearing the scales or graduations to be produced in quantity in a uniform manner, as by stamping, for example, it is desirable that means be provided for adjustably mounting the elements in the instruments so that after testing the temperatures of the bottom of each iron, as by the use of a pyrometer, the thermal element and its pointer or member 14 can be adjusted to place the pointer in alinement with a desired figure or position on the scale, regardless of the variations of temperature of different irons, thereby avoiding the necessity of making an individual scale for each iron.

For this purpose, in the construction shown, the apertures 27 in the supporting plate 12 of the element are made in the form of elongate slots, preferably concentric with the pivot post 13 so that by loosening the screws 26, the element can be turned in one direction or another to set the pointer in correct relation to the scale 31, after the iron has been heated and tested as described above, with the element in place, and the initial positions of the pointer relative to the temperature of the iron noted. In this manner, the thermal element can be easily and quickly set to the correct position in each iron, while, nevertheless, all parts of the instrument can be made exactly alike, and, therefore, produced in an economical manner.

It should be understood that the calibration or numerals on the scale are arbitrary, and each division of the scale may represent, for example, one hundred degrees of temperature, or otherwise, as desired.

While, as illustrated in the drawings, the iron A is shown as being heated by a gas burner a′, the indicator is also applicable for use on implements heated by electricity, steam or otherwise.

Claim:—

In a temperature indicating instrument for a pressing implement, the combination of a casing secured to said implement, a support in said casing, a post rotatably journalled in said support, a thermal element adapted to be affected by and expand or contract with variations in temperature in said implement and having one end fixed to said support and its other fixed to said post so as to rotate the latter by the expansion or contraction of said element, a pointer fixed to said post to turn about the axis of the latter with the rotation thereof, a graduated scale on said casing arranged substantially concentric with the axis of said post and past which said pointer swings, and a connection for securing said support to said casing and which is adjustable concentrically with the axis of said post whereby said support, said element and said pointer can be adjusted about said axis for placing said pointer in desired relation to said scale.

FREDERICK J. CLARK.